(12) United States Patent
Barnett et al.

(10) Patent No.: US 11,210,854 B2
(45) Date of Patent: Dec. 28, 2021

(54) SYSTEMS AND METHODS FOR PROVIDING AUGMENTED REALITY PERSONALIZED CONTENT

(71) Applicant: Facebook, Inc., Menlo Park, CA (US)

(72) Inventors: John Samuel Barnett, Newark, CA (US); Dantley Davis, Morgan Hill, CA (US); Congxi Lu, Los Angeles, CA (US); Jonathan Morton, Menlo Park, CA (US); Peter Vajda, Palo Alto, CA (US); Joshua Charles Harris, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 242 days.

(21) Appl. No.: 15/849,620

(22) Filed: Dec. 20, 2017

(65) Prior Publication Data

US 2018/0189840 A1   Jul. 5, 2018

Related U.S. Application Data

(60) Provisional application No. 62/441,109, filed on Dec. 30, 2016.

(51) Int. Cl.
*G06Q 30/00* (2012.01)
*G06T 19/00* (2011.01)
(Continued)

(52) U.S. Cl.
CPC ........ *G06T 19/006* (2013.01); *G06K 9/00671* (2013.01); *G06K 9/6256* (2013.01);
(Continued)

(58) Field of Classification Search
None
See application file for complete search history.

(56) References Cited

U.S. PATENT DOCUMENTS 8,098,171 B1 * 1/2012 Szczerba ............... B60Q 9/008
340/438
9,363,569 B1 * 6/2016 van Hoff ........... H04N 21/4223
(Continued)

FOREIGN PATENT DOCUMENTS

AU          2013213701          2/2014
CN          105069644 A         11/2015
(Continued)

OTHER PUBLICATIONS

Carmigniani, Julie, et al. "Augmented reality technologies, systems and applications." Multimedia tools and applications 51.1 (2011): 341-377. (Year: 2011).*

(Continued)

*Primary Examiner* — Michael Bekerman
(74) *Attorney, Agent, or Firm* — Sheppard Mullin Richter & Hampton LLP

(57) ABSTRACT

Systems, methods, and non-transitory computer readable media can determine a placement in a camera view for displaying an augmented reality (AR) advertisement, where the camera view is associated with a computing device. An AR advertisement for a user associated with the computing device can be determined based on attributes associated with the user. Display of the AR advertisement can be caused at the determined placement in the camera view.

20 Claims, 7 Drawing Sheets

(51) Int. Cl.
  *G06T 7/70* (2017.01)
  *G06K 9/66* (2006.01)
  *G06Q 50/00* (2012.01)
  *G06N 20/00* (2019.01)
  *G06K 9/00* (2006.01)
  *G06K 9/62* (2006.01)
  *G06Q 30/02* (2012.01)
  *G06T 15/20* (2011.01)
(52) U.S. Cl.
  CPC ............... *G06K 9/66* (2013.01); *G06N 20/00* (2019.01); *G06Q 30/0269* (2013.01); *G06Q 30/0277* (2013.01); *G06Q 50/01* (2013.01); *G06T 7/70* (2017.01); *G06T 15/205* (2013.01)

(56) References Cited

U.S. PATENT DOCUMENTS

| | | | | |
|---|---|---|---|---|
| 9,489,635 | B1* | 11/2016 | Zhu | G06K 9/6282 |
| 10,783,554 | B1* | 9/2020 | Hylton | G06Q 30/0259 |
| 2010/0138491 | A1* | 6/2010 | Churchill | G06Q 50/00 |
| | | | | 709/204 |
| 2011/0055024 | A1* | 3/2011 | Shen | G06Q 30/0276 |
| | | | | 705/14.72 |
| 2011/0090219 | A1 | 4/2011 | Kruglick | |
| 2011/0213664 | A1* | 9/2011 | Osterhout | G02B 27/017 |
| | | | | 705/14.58 |
| 2011/0214082 | A1* | 9/2011 | Osterhout | G02B 27/017 |
| | | | | 715/773 |
| 2011/0302535 | A1* | 12/2011 | Clerc | G06F 3/04815 |
| | | | | 715/848 |
| 2012/0004956 | A1* | 1/2012 | Huston | G06Q 30/0207 |
| | | | | 705/14.1 |
| 2012/0062596 | A1* | 3/2012 | Bedi | G06Q 30/0267 |
| | | | | 345/633 |
| 2012/0072420 | A1 | 3/2012 | Moganti | |
| 2012/0157190 | A1* | 6/2012 | Hungate | G06Q 30/0241 |
| | | | | 463/25 |
| 2012/0229909 | A1* | 9/2012 | Clavin | G02B 27/017 |
| | | | | 359/630 |
| 2012/0230538 | A1 | 9/2012 | Calman | |
| 2012/0231424 | A1 | 9/2012 | Calman | |
| 2012/0237085 | A1* | 9/2012 | Meier | G06T 7/70 |
| | | | | 382/103 |
| 2012/0295637 | A1* | 11/2012 | Hannuksela | G01S 3/8034 |
| | | | | 455/456.1 |
| 2013/0073388 | A1 | 3/2013 | Heath | |
| 2013/0147837 | A1 | 6/2013 | Stroila | |
| 2013/0238617 | A1* | 9/2013 | Postrel | G06Q 50/01 |
| | | | | 707/736 |
| 2013/0293530 | A1* | 11/2013 | Perez | G06K 9/00671 |
| | | | | 345/418 |
| 2013/0293580 | A1 | 11/2013 | Spivac | |
| 2013/0311329 | A1* | 11/2013 | Knudson | G06Q 50/01 |
| | | | | 705/26.9 |
| 2013/0317912 | A1* | 11/2013 | Bittner | G06T 19/006 |
| | | | | 705/14.64 |
| 2014/0002496 | A1* | 1/2014 | Lamb | G06T 19/006 |
| | | | | 345/633 |
| 2014/0047464 | A1* | 2/2014 | Lev | H04N 21/4223 |
| | | | | 725/12 |
| 2014/0100994 | A1* | 4/2014 | Tatzel | G06Q 30/0276 |
| | | | | 705/27.1 |
| 2014/0100997 | A1* | 4/2014 | Mayerle | G06Q 30/0276 |
| | | | | 705/27.2 |
| 2014/0172570 | A1* | 6/2014 | y Arcas | H04W 4/029 |
| | | | | 705/14.58 |
| 2014/0172640 | A1* | 6/2014 | Argue | G06Q 30/0641 |
| | | | | 705/26.61 |
| 2014/0195277 | A1* | 7/2014 | Kim | G06Q 10/02 |
| | | | | 705/5 |
| 2014/0214547 | A1* | 7/2014 | Signorelli | G06Q 30/0267 |
| | | | | 705/14.64 |
| 2014/0278053 | A1* | 9/2014 | Wu | G01C 21/3647 |
| | | | | 701/408 |
| 2014/0279860 | A1* | 9/2014 | Pan | G06F 16/9537 |
| | | | | 707/609 |
| 2015/0058102 | A1* | 2/2015 | Christensen | G06F 3/04847 |
| | | | | 705/14.6 |
| 2015/0073907 | A1* | 3/2015 | Purves | G06Q 20/32 |
| | | | | 705/14.58 |
| 2015/0109338 | A1* | 4/2015 | McKinnon | G06F 16/50 |
| | | | | 345/633 |
| 2015/0109451 | A1* | 4/2015 | Dhankhar | G01G 19/40 |
| | | | | 348/150 |
| 2015/0170256 | A1* | 6/2015 | Pettyjohn | G06F 3/04812 |
| | | | | 705/14.49 |
| 2015/0302500 | A1* | 10/2015 | Koch | G06Q 30/0242 |
| | | | | 705/26.61 |
| 2015/0379777 | A1 | 12/2015 | Sasaki | |
| 2016/0026253 | A1* | 1/2016 | Bradski | G02B 27/225 |
| | | | | 345/8 |
| 2016/0133230 | A1 | 5/2016 | Daniels | |
| 2016/0217623 | A1* | 7/2016 | Singh | G09G 3/003 |
| 2016/0253844 | A1 | 9/2016 | Petrovskaya et al. | |
| 2018/0039479 | A1* | 2/2018 | Fransen | G06F 16/335 |
| 2018/0101956 | A1 | 4/2018 | Elkins | |
| 2018/0150899 | A1* | 5/2018 | Waldron | G01S 19/13 |

FOREIGN PATENT DOCUMENTS

| | | | |
|---|---|---|---|
| CN | 105405046 A | 3/2016 | |
| GB | 2535728 | 8/2016 | |
| JP | 2013521576 A | 6/2013 | |
| JP | 2014507725 | 3/2014 | |
| JP | 2014174589 A | 9/2014 | |
| KR | 10-2009-0001667 | 1/2009 | |
| KR | 10-2011-0082690 | 7/2011 | |
| KR | 10-2012-0040831 | 4/2012 | |
| KR | 10-2013-0060299 | 6/2013 | |
| WO | 2012106438 | 8/2012 | |
| WO | WO-2014031899 A1 * | 2/2014 | ........... G06T 19/006 |

OTHER PUBLICATIONS

Jain, Vipul. "The Impact of Social Commerce on Consumer Behaviour: with special reference to F-commerce." Available at SSRN 2403898 (2014). (Year: 2014).*
Jamali, Bahman, Abolghasem Sadeghi-Niaraki, and Reza Arasteh. "Application of geospatial analysis and augmented reality visualization in indoor advertising." International Journal of Geography and Geology 4.1 (2015): 11-23. (Year: 2015).*
Cankaya, Ibrahim Arda, et al. "Mobile indoor navigation system in iOS platform using augmented reality." 2015 9th International Conference on Application of Information and Communication Technologies (AICT). IEEE, 2015. (Year: 2015).*
Ilhan, ibrahim, and Evrim çeltek. "Mobile marketing: Usage of augmented reality in tourism." Gaziantep university journal of social sciences 15.2 (2016): 581-599. (Year: 2016).*
De Chiara, Davide, et al. "Geomarketing Policies and Augmented Reality for Advertisement Delivery on Mobile Devices." DMS. 2011. (Year: 2011).*
Wang, Ching-Sheng, Chien-Liang Chen, and Shih-Han Chen. "An augmented reality mobile navigation system integrating indoor localization and recommendation mechanism." International Conference on Frontier Computing. Springer, Singapore, 2016. (Year: 2016).*
European Patent Application No. 17/210,891, Search Report dated Feb. 28, 2018.
International Application No. PCT/US2017/068036, International Search Report and Written Opinion dated Apr. 17, 2018.
International Application No. PCT/US2017/068048, International Search Report and Written Opinion dated Apr. 24, 2018.
European Patent Application No. 17210891.2, Search Report dated Feb. 4, 2020, 6 pages.
Uchiyama, Hiroyuki, et al., "Method for Displaying Images on Urban Structures by Augmented Reality", The Institute of Electronics, Information and Communication Engineers, IEICE Technical Report, Mar. 22, 2012, 7 pages.

(56) References Cited

OTHER PUBLICATIONS

"Basic 2: Registration Technique" [non-official translation], Journal of Information Processing, vol. 51, No. 4, Apr. 15, 2010, 7 pages.
Japanese Patent Application No. 2019-535926, Office Action dated Mar. 16, 2021, with English translation, 10 pages.
Decision of Rejection dated Oct. 12, 2021 for Japanese Application No. 2019535926, filed Dec. 21, 2017, 10 pages.
First Office Action dated Aug. 18, 2021 for Chinese Application No. 2017800875240, filed Dec. 21, 2017, 13 pages.
"Foundation 2: Geometrical Registration Technique," Journal of Information Processing, Apr. 15, 2010, 6 pages.

\* cited by examiner

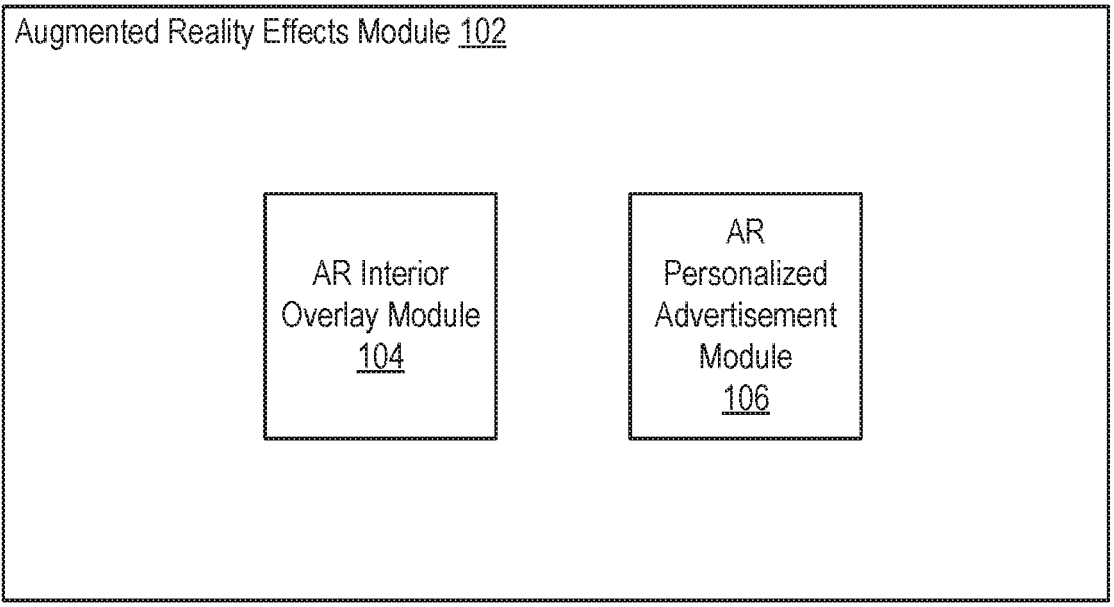
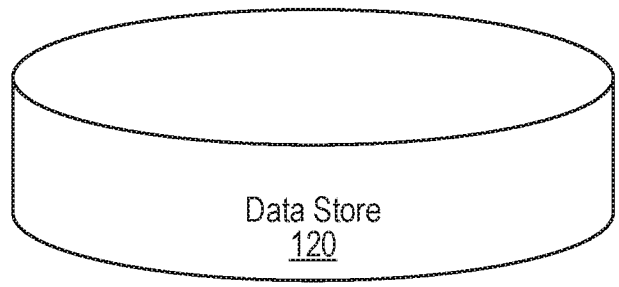
FIGURE 1

400

Obtain image data from a camera view associated with a computing device, the image data associated with an interior space
402

Determine a portion of the image data for displaying one or more augmented reality (AR) content items
404

Determine an AR content item to display in the camera view
406

Provide the AR content item for presentation in the camera view based on the determined portion of the image data
408

```
Determine a placement in a camera view for displaying an augmented reality
(AR) advertisement, the camera view associated with a computing device
502
```

```
Determine an AR advertisement for a user associated with the computing device
based on attributes associated with the user
504
```

```
Cause display of the AR advertisement at the determined placement in the
camera view
506
```

FIGURE 5

SYSTEMS AND METHODS FOR PROVIDING AUGMENTED REALITY PERSONALIZED CONTENT

CROSS-REFERENCE TO RELATED APPLICATIONS

This application claims priority to U.S. Provisional Patent Application No. 62/441,109, filed on Dec. 30, 2016 and entitled "SYSTEMS AND METHODS FOR PROVIDING AUGMENTED REALITY EFFECTS, PERSONALIZED CONTENT, AND THREE-DIMENSIONAL MAPPING ASSOCIATED WITH INTERIOR SPACES", which is incorporated in its entirety herein by reference.

FIELD OF THE INVENTION

The present technology relates to the field of augmented reality (AR). More particularly, the present technology relates to techniques for providing AR effects or content associated with media content.

BACKGROUND

Users often utilize computing devices for a wide variety of purposes. Users can use their computing devices to, for example, interact with one another, access media content, share media content, and create media content. The media content can include one or a combination of, for example, text, images, videos, and audio. In some cases, media content can be provided by users of a social networking system for consumption by others. The media content can be captured on computing devices of users and uploaded to the social networking system. For example, a user can capture an image or a video in a camera view associated with an application, such as an application provided by the social networking system.

SUMMARY

Various embodiments of the present disclosure can include systems, methods, and non-transitory computer readable media configured to obtain image data from a camera view associated with a computing device, where the image data is associated with an interior space. A portion of the image data for displaying one or more augmented reality (AR) content items can be determined. An AR content item to display in the camera view can be determined. The AR content item can be provided for presentation in the camera view based on the determined portion of the image data.

In some embodiments, one or more objects included in the image data from the camera view can be identified.

In certain embodiments, the one or more objects are identified based on a machine learning model.

In an embodiment, the portion is an object identified in the image data from the camera view.

In some embodiments, a three-dimensional (3D) map of the interior space can be provided.

In certain embodiments, the 3D map is based on simultaneous localization and mapping (SLAM).

In an embodiment, the image data can be mapped to the 3D map of the interior space in order to determine one or more of a location or a direction of a user associated with the camera view in the 3D map, wherein the camera view represents a perspective of the user.

In some embodiments, the 3D map includes a 3D model of one or more objects in the interior space.

In certain embodiments, the portion is associated with one or more of a predefined section or a predefined object in the 3D map.

In an embodiment, information can be provided in response to a gesture associated with the AR content item.

Various embodiments of the present disclosure can include systems, methods, and non-transitory computer readable media configured to determine a placement in a camera view for displaying an augmented reality (AR) advertisement, where the camera view is associated with a computing device. An AR advertisement for a user associated with the computing device can be determined based on attributes associated with the user. Display of the AR advertisement can be caused at the determined placement in the camera view.

In some embodiments, the determining the placement in the camera view comprises identifying one or more objects in the camera view.

In certain embodiments, the identifying the one or more objects in the camera view is based on a machine learning model.

In an embodiment, the AR advertisement for the user is determined based at least in part on the one or more objects.

In some embodiments, the one or more objects include an object in an exterior space in the camera view.

In certain embodiments, the determining the placement in the camera view comprises mapping image data of the camera view to a three-dimensional (3D) map of an interior space in the camera view.

In an embodiment, the 3D map of the interior space is based on simultaneous localization and mapping (SLAM).

In some embodiments, the placement is associated with a predefined section or a predefined object in the 3D map.

In certain embodiments, the attributes associated with the user include one or more of: an age, an age range, a gender, a geographical region, or an interest.

In an embodiment, the determining the AR advertisement is based on information associated with the user in a social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including an example augmented reality effects module configured to provide various AR effects associated with a camera view, according to an embodiment of the present disclosure.

FIG. 4 illustrates an example first method for providing AR overlays associated with interior spaces, according to an embodiment of the present disclosure.

FIG. 5 illustrates an example second method for providing AR personalized advertisements, according to an embodiment of the present disclosure.

Figure 2:
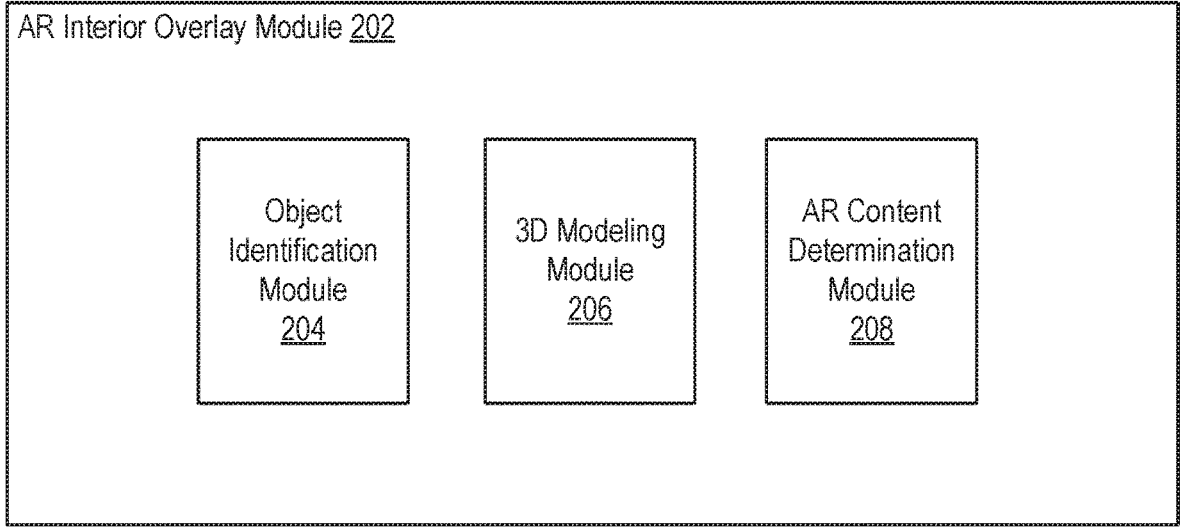
FIG. 2 illustrates an example AR interior overlay module configured to provide AR overlays associated with interior spaces, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Augmented Reality Effects

Users often utilize computing devices for a wide variety of purposes. Users can use their computing devices to, for example, interact with one another, access media content, share media content, and create media content. The media content can include one or a combination of, for example, text, images, videos, and audio. In some cases, media content can be provided by users of a social networking system for consumption by others.

Media content can be created on computing devices of users and uploaded to the social networking system. For example, a user can capture an image or a video shown in a camera view associated with an application, such as an application provided by the social networking system. Conventional approaches specifically arising in the realm of computer technology may provide an overlay in a camera view associated with creating media content. However, such overlay may not be related to image data shown in the camera view. Accordingly, conventional approaches may not provide relevant information in connection with image data in the camera view.

An improved approach rooted in computer technology can overcome the foregoing and other disadvantages associated with conventional approaches specifically arising in the realm of computer technology. Based on computer technology, the disclosed technology can provide augmented reality (AR) effects in a camera view associated with an application. The disclosed technology can provide AR effects in a camera view in connection with interior spaces shown in the camera view. In some embodiments, one or more objects in an interior space can be identified, and AR overlays can be provided in connection with the identified objects. For example, objects can be identified based on object detection or recognition techniques. In other embodiments, a 3D mapping of an interior space can be provided, for example, by an entity associated with the interior space. A camera view in the interior space can be mapped to a 3D map of the interior space based on a perspective represented by the camera view. AR overlays can be provided in connection with a location and/or a direction of the user in the 3D map of the interior space. For example, it can be determined that the user is at a certain location in the 3D map and that the user is looking at a certain section or a certain object, and AR overlays can be provided based on the certain section or the certain object. The disclosed technology can also provide AR personalized content, such as advertisements, in the camera view. AR personalized advertisements can be selected based on selected criteria, such as attributes associated with users, objects, etc. AR personalized advertisements can be displayed over one or more objects identified within the camera view. AR personalized advertisements can also be displayed in predefined locations or areas in the camera view. In this way, the disclosed technology can provide AR content associated with image data shown in the camera view and provide an interactive and interesting user experience.

FIG. 1 illustrates an example system 100 including an example augmented reality effects module 102 configured to provide various AR effects associated with a camera view, according to an embodiment of the present disclosure. The augmented reality effects module 102 can include an AR interior overlay module 104 and an AR personalized advertisement module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the augmented reality effects module 102 can be implemented in any suitable combinations. For illustrative purposes, the disclosed technology is described in connection with a social networking system, but the disclosed technology can apply to any type of application and/or system.

The augmented reality effects module 102 can provide various AR effects associated with image data shown in a camera view. The camera view can show image data acquired by a camera. Image data shown in the camera view can be captured as a media content item, such as an image or a video. The augmented reality effects module 102 can provide one or more AR content items associated with image data shown in the camera view. An AR content item can include any content that provides an AR effect, such as an AR overlay. AR content items can be provided in the camera view. AR content items may be captured as a part of a media content item. For example, if an AR overlay is displayed in the camera view and an image as shown in the camera view is captured, the AR overlay can be included as a part of the image. In some embodiments, a media content item can be live and can be uploaded to a social networking system as it is being recorded. In such embodiments, AR content items similarly can be provided for a live media content item.

The AR interior overlay module 104 can provide AR content items, such as AR overlays, associated with interior spaces. For example, the AR interior overlay module 104 can provide AR overlays for one or more objects identified within a camera view showing an interior space. As another example, the AR interior overlay module 104 can provide AR overlays for a user based on a 3D mapping of an interior space shown in a camera view. An interior space can include any interior environment, such as inside of a building or a structure. Examples of interior spaces can include a store, an office, etc. Functionality of the AR interior overlay module 104 is descried in more detail herein.

The AR personalized advertisement module 106 can provide personalized AR content items, such as AR personalized advertisements. The AR personalized advertisement module 106 can determine a placement of a personalized advertisement within a camera view. The AR personalized advertisement module 106 can select a personalized advertisement to display for a particular user based on selected criteria. The selected personalized advertisement can be provided at the determined placement in the camera view. Functionality of the AR personalized advertisement module 106 is described in more detail herein.

In some embodiments, the augmented reality effects module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the augmented reality effects module 102 can be, in part or in whole, implemented as software running on one or more computing devices or systems, such as on a server system or a client computing device. In some instances, the augmented reality effects module 102 can be, in part or in whole, implemented within or configured to operate in conjunction or be integrated with a social networking system (or service), such as a social networking system 630 of FIG. 6. Likewise, in some instances, the augmented reality effects module 102 can be, in part or in whole, implemented within or configured to operate in conjunction or be integrated with a client computing device, such as the user device 610 of FIG. 6. For example, the augmented reality effects module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the augmented reality effects module 102. The data maintained by the data store 120 can include, for example, information relating to AR overlays, image data in camera views, object identification (e.g., object detection or recognition), 3D mapping of spaces, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the augmented reality effects module 102 can be configured to communicate and/or operate with the data store 120. In some embodiments, the data store 120 can be a data store within a client computing device. In some embodiments, the data store 120 can be a data store of a server system in communication with the client computing device.

FIG. 2 illustrates an example AR interior overlay module 202 configured to provide AR overlays associated with interior spaces, according to an embodiment of the present disclosure. In some embodiments, the AR interior overlay module 104 of FIG. 1 can be implemented with the example AR interior overlay module 202. As shown in the example of FIG. 2, the example AR interior overlay module 202 can include an object identification module 204, a 3D modeling module 206, and an AR content determination module 208.

The object identification module 204 can identify objects shown within a camera view. Identification of objects can be triggered based on appropriate triggering conditions (e.g., initiation of a camera view). The object identification module 204 can detect objects within a camera view based on object recognition or detection techniques. The object identification module 204 can detect objects within a camera view based on a machine learning model. In some embodiments, the machine learning model can be a classifier. The machine learning model can be trained based on training data that includes objects and associated images. The trained machine learning model can be applied to images or video of objects in order to determine objects included within a camera view. In some cases, objects may move within a camera view, and objects can be tracked in order to detect objects. The object identification module 204 can detect objects within a camera view in or near real time. In some embodiments, objects can be logos and/or brands. In other embodiments, objects can be products. In certain embodiments, objects can be windows, doors, empty walls, etc. Many variations are possible.

The 3D modeling module 206 can provide a three-dimensional (3D) mapping of an interior space. For example, a 3D map of an interior space can be provided by an entity associated with the interior space (e.g., a user, a business owner, a company, etc.). A 3D map can provide a 3D depth map of an interior space. In some cases, a 3D map of an interior space can also include 3D models of objects within the interior space. In some embodiments, a 3D map of an interior space can be provided based on simultaneous localization and mapping (SLAM) techniques. For example, SLAM techniques can construct or update a map of an unknown environment while simultaneously keeping track of a user's location within the environment. Objects within an interior space can also be mapped based on SLAM techniques. An entity associated with an interior space can specify or designate various sections and/or objects within a 3D map of the interior space for providing AR overlays. For example, an entity associated with a store can specify sections for different store departments within a 3D map of the store in which to provide AR overlays.

The 3D modeling module 206 can map a camera view presented to a user to a 3D map of an interior space. Mapping of image data in a camera view to a 3D map of an interior space can be triggered based on appropriate triggering conditions (e.g., initiation of a camera view). The 3D modeling module 206 can determine a user's location and/or direction within a 3D map based on a perspective as shown in the user's camera view. Image data in the camera view can represent a point of view of the user within the interior space, and the 3D modeling module 206 can determine where the user is within the interior space and what the user is seeing within the interior space by mapping the image data to the 3D map. The 3D modeling module 206 can determine any sections and/or objects the user is viewing through the camera view, and related AR overlays can be provided in connection with the determined sections and/or objects, for example, by the AR content determination module 208.

The AR content determination module 208 can determine and provide an AR overlay in connection with an interior space. An AR overlay can include any type of content items. Examples of content items can include text, images, videos, audios, etc. Content items can include two-dimensional (2D) content and/or three-dimensional content. In some embodiments, the AR content determination module 208 can provide the same or similar AR overlays for all users. For example, an AR overlay can provide information associated with a store event or sale. In other embodiments, the AR content determination module 208 can select an AR overlay to provide for a specific user based on selected criteria. Selected criteria can include attributes associated with users, products, etc. For example, an AR overlay can provide product recommendations for a particular user based on products that the user has looked at within a store. In some embodiments, a user can interact with AR overlays based on various gestures applied through an interface presenting a camera view. For example, a particular gesture, such as a touch gesture, can correspond to a particular functionality. As an example, a user can access additional information (e.g., context information) in association with an AR overlay by performing a particular touch gesture.

In some embodiments, the AR content determination module 208 can determine AR overlays to provide based on identified objects within a camera view. For example, the AR content determination module 208 can determine AR overlays for one or more objects identified by the object identification module 204. For instance, an object can be a logo or a brand, and an AR overlay can be displayed in the camera view to provide information about one or more products associated with the logo or the brand. In certain embodiments, the AR content determination module 208 can also determine a location within a camera view for providing AR overlays based on identified objects within the camera view. For example, AR overlays can be provided over one or more other objects detected in the camera view, such as doors, windows, or empty spaces. Many variations are possible.

In certain embodiments, the AR content determination module 208 can determine AR overlays to provide based on a mapping of image data from a camera view to a 3D map of an interior space. As explained above, a location and/or a direction of a user can be determined within a 3D map of an interior space, for example, by the 3D modeling module 206. The AR content determination module 208 can provide AR overlays based on where in the 3D map a user is and what the user is viewing. For example, if the user is looking at a certain product, an AR overlay can provide information associated with the product. The AR content determination module 208 can provide AR overlays in one or more designated sections in the 3D map. The AR content determination module 208 can also provide AR overlays in connection with one or more designated objects in the 3D map. For example, sections and/or objects for which to provide AR overlays can be specified or predefined by an entity associated with an interior space. As an example, an entity associated with an interior space can include an organization, a person or an agent of an organization, etc. For instance, the entity can be a company associated with the interior space, an employee of the company, an administrator of the company, etc.

The AR content determination module 208 can provide various types of information in AR overlays. Examples of information provided in AR overlays can include information relating to products, stores, events (e.g., sales), recommendations for products, etc. In some cases, information to be provided in an AR overlay can be defined by an entity associated with an interior space. For example, the entity can choose a video or an image to display over a section in the 3D map. In some embodiments, a bot for assisting a user can be provided as an AR overlay. For example, a bot can appear as an object or an animation within a camera view. As another example, a bot can appear as a messaging functionality within a camera view. All examples herein are provided for illustrative purposes, and there can be many variations and other possibilities.

Figure 3:
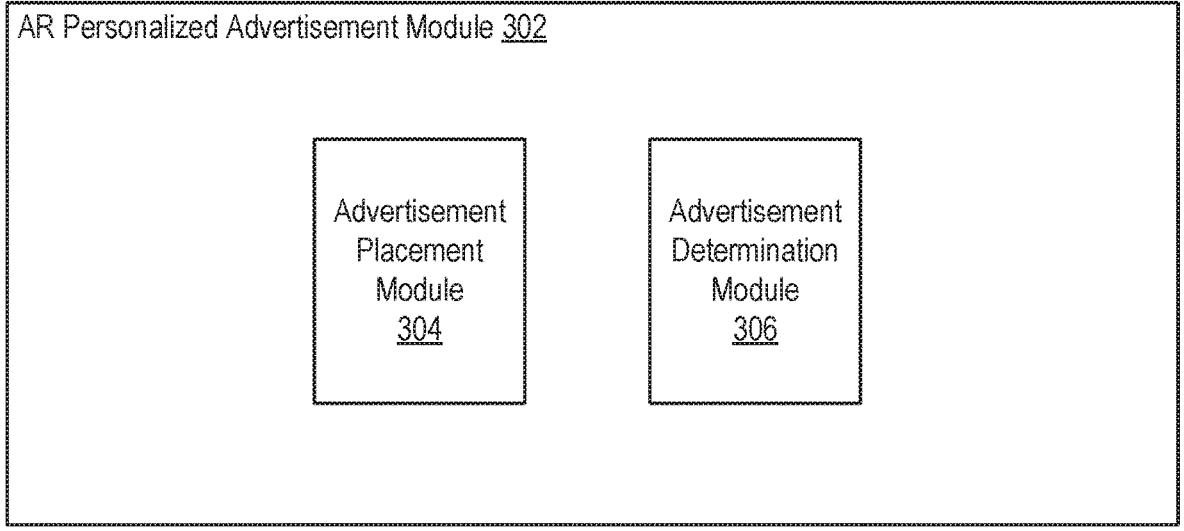
FIG. 3 illustrates an example AR personalized advertisement module configured to provide AR personalized advertisements, according to an embodiment of the present disclosure.

FIG. 3 illustrates an example AR personalized advertisement module 302 configured to provide AR personalized advertisements, according to an embodiment of the present disclosure. In some embodiments, the AR personalized advertisement module 106 of FIG. 1 can be implemented with the example AR personalized advertisement module 302. As shown in the example of FIG. 3, the example AR personalized advertisement module 302 can include an advertisement placement module 304 and an advertisement determination module 306.

The advertisement placement module 304 can determine one or more locations within a camera view for displaying AR personalized advertisements. In some embodiments, the advertisement placement module 304 can determine a location based on one or more objects identified within a camera view. Object identification can be similar to object identification described above. For example, objects within a camera view can be identified based on object recognition or detection techniques. A machine learning model can be used to identify objects. Personalized advertisements can be provided over one or more identified objects within a camera view. In other embodiments, the advertisement placement module 304 can determine a location based on a 3D mapping of an interior space. 3D mapping of an interior space can be similar to 3D mapping described above. For example, an entity associated with an interior space can designate or predefine one or more sections and/or objects within a 3D map of the interior space for providing AR personalized advertisements. Personalized advertisements can be provided in designated sections in the 3D map or in connection with designated objects in the 3D map. The advertisement placement module 304 can provide personalized advertisements for exterior spaces as well as interior spaces. Examples of exterior spaces can include parks, stadiums, landmarks, buildings, etc. As just one example, a personalized advertisement can be provided over a mound in a baseball stadium. The advertisement placement module 304 can also provide personalized advertisements for public places as well as private places. Many variations are possible.

The advertisement determination module 306 can determine one or more personalized advertisements to provide for a user within a camera view. The advertisement determination module 306 can select an advertisement to provide for a specific user based on selected criteria. Selected criteria can include attributes associated with users, objects (e.g., products), etc. Examples of attributes associated with users can include an age, an age range, a gender, a geographical region (e.g., a country, a state, a county, a city, etc.), an interest, etc. In some embodiments, the advertisement determination module 306 can select an advertisement for a user based on information associated with the user in a social networking system. A user can create content and engage in various activities in the social networking system, such as creating posts, commenting on posts, liking posts, uploading media content, etc. The advertisement determination module 306 can determine an advertisement based on the user's content and activities within the social networking system. The advertisement determination module 306 can also select an advertisement for a user based on rating methods, a social graph, and other attributes associated with the social networking system. An AR personalized advertisement can include any type of content items. Examples of content items can include text, images, videos, audios, etc. Content items can include two-dimensional (2D) content and/or three-dimensional content. In some embodiments, an AR personalized advertisement can relate to image data shown in a camera view. For example, the AR personalized advertisement can relate to an object identified in the camera view. In other embodiments, an AR personalized may not relate to image data shown in a camera view, but can be relevant to a user. For example, the AR personalized advertisement can relate to a user's interest that is not directly associated with the image data in the camera view. AR personalized advertisements can be provided as overlays in a camera view. In some embodiments, a user can interact with AR personalized advertisements based on various gestures applied through an interface presenting a camera view. For example, a particular gesture, such as a touch gesture, can correspond to a particular functionality. As an example, a user can access additional information (e.g., context information) in association with an AR personalized advertisement by performing a particular touch gesture. For illustrative purposes, the disclosed technology is explained in connection with AR personalized advertisements, but the disclosed technology can apply to any type of content. All examples herein are provided for illustrative purposes, and there can be many variations and other possibilities.

FIG. 4 illustrates an example first method 400 for providing AR overlays associated with interior spaces, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can obtain image data from a camera view associated with a computing device, the image data associated with an interior space. At block 404, the example method 400 can determine a portion of the image data for displaying one or more augmented reality (AR) content items. At block 406, the example method 400 can determine an AR content item to display in the camera view. At block 408, the example method 400 can provide the AR content item for presentation in the camera view based on the determined portion of the image data. Other suitable techniques that incorporate various features and embodiments of the present disclosure are possible.

FIG. 5 illustrates an example second method 500 for providing AR personalized advertisements, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can determine a placement in a camera view for displaying an augmented reality (AR) advertisement, the camera view associated with a computing device. At block 504, the example method 500 can determine an AR advertisement for a user associated with the computing device based on attributes associated with the user. At block 506, the example method 500 can cause display of the AR advertisement at the determined placement in the camera view. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
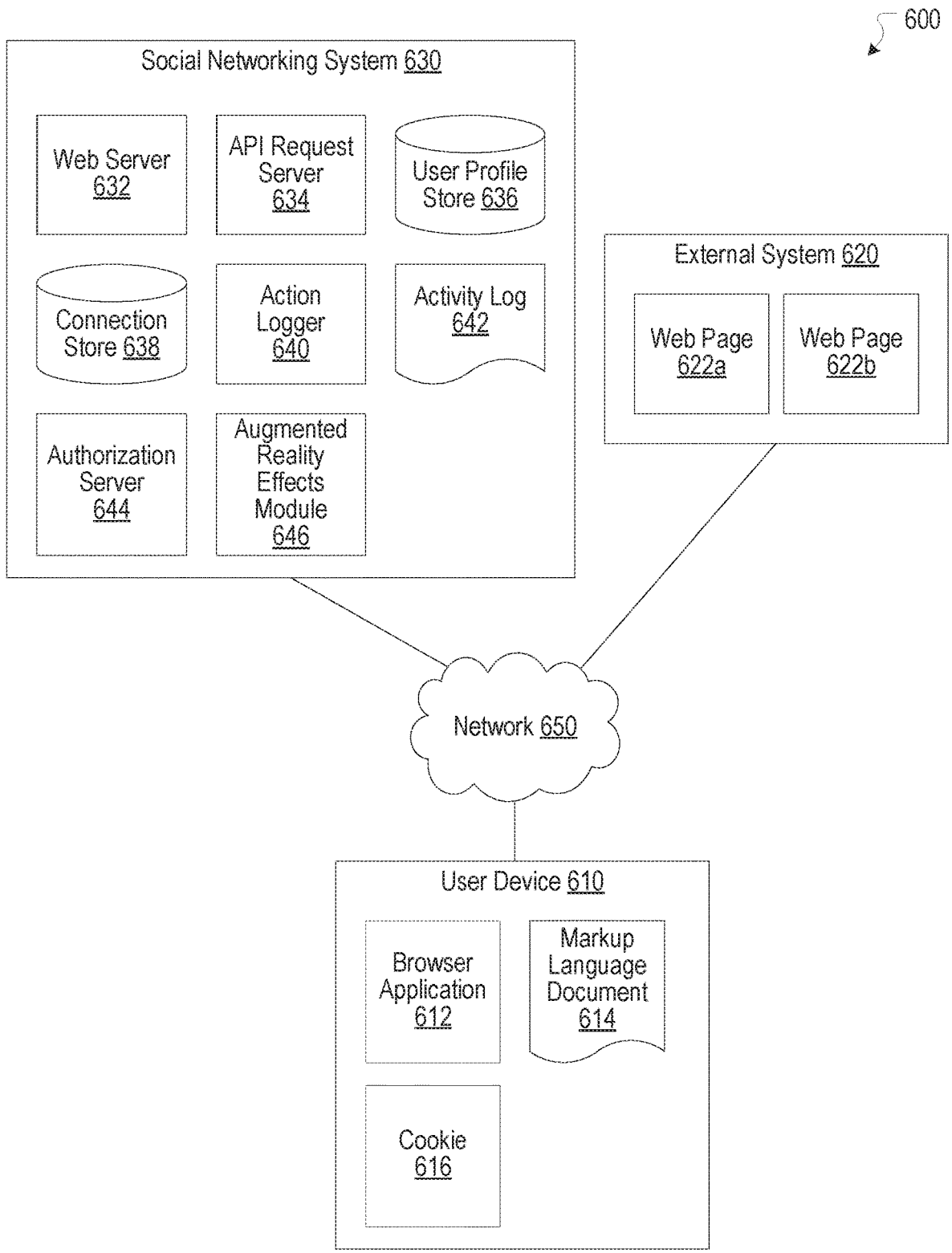
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an augmented reality effects module 646. The augmented reality effects module 646 can be implemented with the augmented reality effects module 102, as discussed in more detail herein. In some embodiments, one or more functionalities of the augmented reality effects module 646 can be implemented in the user device 610.

Hardware Implementation

Figure 7:
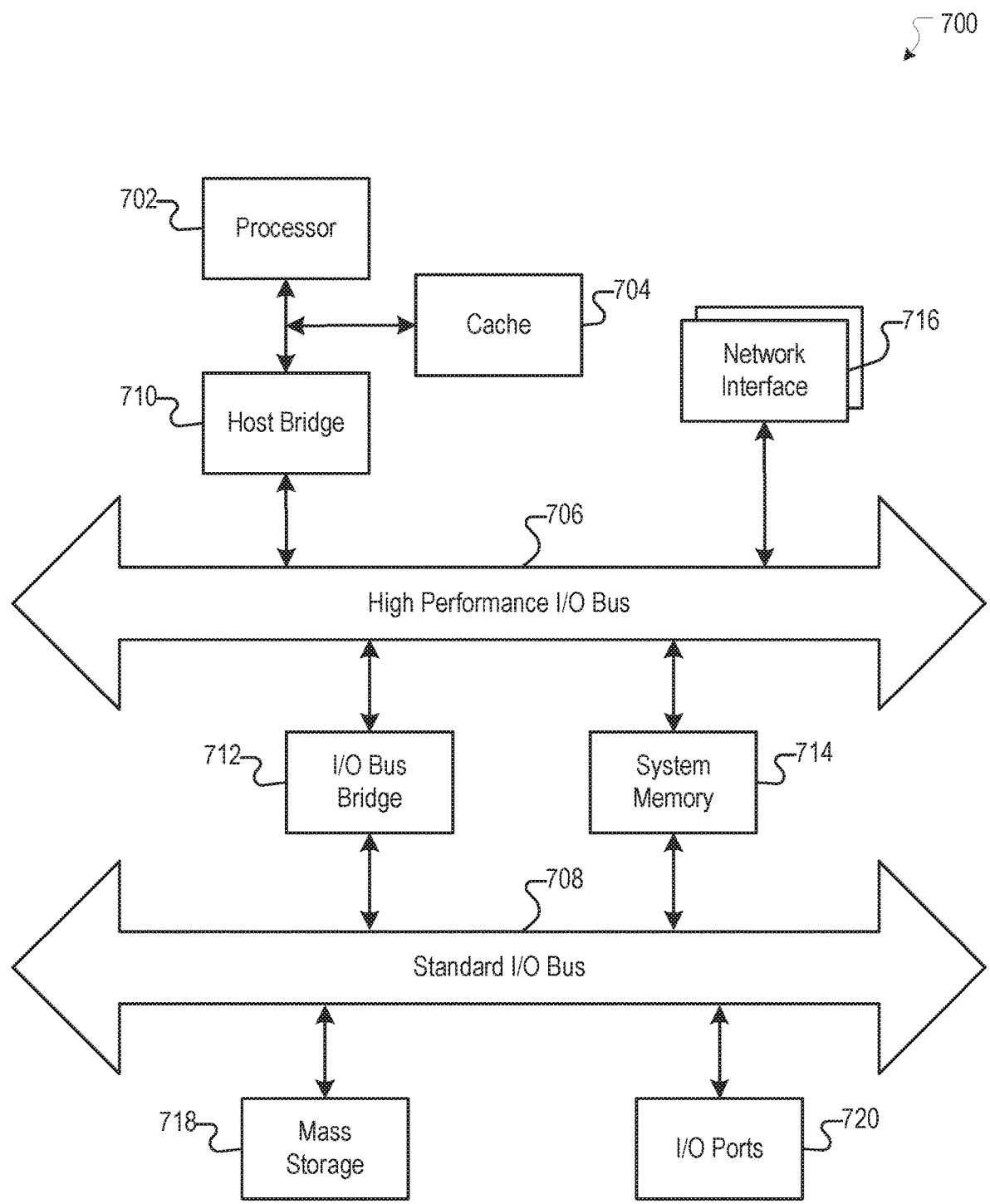
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, a three dimensional map of an interior space associated with a camera view of a computing device;
determining, by the computing system, a location and a direction of a user associated with the computing device in the interior space based on a perspective represented by the camera view;
determining, by the computing system, a placement in the interior space for displaying an augmented reality (AR) advertisement based on the location and the direction of the user, wherein the determining the placement in the interior space comprises:
mapping image data of the camera view to the three dimensional map of the interior space, wherein the image data is uploaded to a system associated with the computing system;
identifying one or more objects reflected in the image data based on a machine learning model associated with the system, wherein the machine learning model is a classifier and trained based on images associated with the one or more objects; and
mapping the one or more objects to the three dimensional map of the interior space based on simultaneous localization and mapping (SLAM);
determining, by the computing system, the AR advertisement for the user based on attributes associated with the user, content created by the user in the system, content engaged with by the user in the system, and objects in the interior space with which the user previously interacted, wherein the attributes are obtained from a social graph associated with the user in the system; and
causing, by the computing system, display of the AR advertisement at the determined placement in the camera view.

2. The computer-implemented method of claim 1, wherein the machine learning model is trained based on training data including at least one of objects or images associated with the objects.

3. The computer-implemented method of claim 1, wherein the AR advertisement for the user is determined based at least in part on the one or more objects.

4. The computer-implemented method of claim 1, wherein the one or more objects include an object in an exterior space in the camera view.

5. The computer-implemented method of claim 1, wherein the placement is associated with a predefined section or a predefined object in the three dimensional map.

6. The computer-implemented method of claim 1, wherein the attributes associated with the user include one or more of: an age, an age range, a gender, a geographical region, or an interest.

7. The computer-implemented method of claim 1, wherein the system is a social networking system.

8. The computer-implemented method of claim 1, wherein the AR advertisement provides information relating to the one or more objects identified in the camera view and includes information relating to at least one of products, stores, events, or product recommendations.

9. The computer-implemented method of claim 1, wherein the AR advertisement includes a video overlaid on the one or more objects identified in the camera view and the video is selected by an organization associated with the interior space.

10. The computer-implemented method of claim 1, wherein the AR advertisement includes a bot for assisting the user and the bot appears as at least one of an object or an animation within the camera view and provides messaging functionality for the user.

11. A computing system comprising:
at least one processor; and
a memory storing instructions that, when executed by the at least one processor, cause the system to perform:

receiving a three dimensional map of an interior space associated with a camera view of a computing device;

determining a location and a direction of a user associated with the computing device in the interior space based on a perspective represented by the camera view;

determining a placement in the interior space for displaying an augmented reality (AR) advertisement based on the location and the direction of the user, wherein the determining the placement in the interior space comprises:

mapping image data of the camera view to the three dimensional map of the interior space, wherein the image data is uploaded to a system associated with the computing system;

identifying one or more objects reflected in the image data based on a machine learning model associated with the system, wherein the machine learning model is a classifier and trained based on images associated with the one or more objects; and mapping the one or more objects to the three dimensional map of the interior space based on simultaneous localization and mapping (SLAM);

determining the AR advertisement for the user based on attributes associated with the user, content created by the user in the system, content engaged with by the user in the system, and objects in the interior space with which the user previously interacted, wherein the attributes are obtained from a social graph associated with the user in the system; and causing display of the AR advertisement at the determined placement in the camera view.

12. The computing system of claim 11, wherein the AR advertisement for the user is determined based at least in part on the one or more objects.

13. The computing system of claim 11, wherein the placement is associated with a predefined section or a predefined object in the three dimensional map.

14. The computing system of claim 11, wherein the AR advertisement provides information relating to the one or more objects identified in the camera view and includes information relating to at least one of products, stores, events, or product recommendations.

15. The computing system of claim 11, wherein the AR advertisement includes a video overlaid on the one or more objects identified in the camera view and the video is selected by an organization associated with the interior space.

16. The computing system of claim 11, wherein the AR advertisement includes a bot for assisting the user and the bot appears as at least one of an object or an animation within the camera view and provides messaging functionality for the user.

17. A non-transitory computer readable medium including instructions that, when executed by at least one processor of a computing system, cause the computing system to perform a method comprising:

receiving a three dimensional map of an interior space associated with a camera view of a computing device;

determining a location and a direction of a user associated with the computing device in the interior space based on a perspective represented by the camera view;

determining a placement in the interior space for displaying an augmented reality (AR) advertisement based on the location and the direction of the user, wherein the determining the placement in the interior space comprises:

mapping image data of the camera view to the three dimensional map of the interior space, wherein the image data is uploaded to a system associated with the computing system;

identifying one or more objects reflected in the image data based on a machine learning model associated with the system, wherein the machine learning model is a classifier and trained based on images associated with the one or more objects; and mapping the one or more objects to the three dimensional map of the interior space based on simultaneous localization and mapping (SLAM);

determining the AR advertisement for the user based on attributes associated with the user, content created by the user in the system, content engaged with by the user in the system, and objects in the interior space with which the user previously interacted, wherein the attributes are obtained from a social graph associated with the user in the system; and causing display of the AR advertisement at the determined placement in the camera view.

18. The non-transitory computer readable medium of claim 17, wherein the AR advertisement for the user is determined based at least in part on the one or more objects.

19. The non-transitory computer readable medium of claim 17, wherein the placement is associated with a predefined section or a predefined object in the three dimensional map.

20. The non-transitory computer readable medium of claim 17, wherein the AR advertisement provides information relating to the one or more objects identified in the camera view and includes information relating to at least one of products, stores, events, or product recommendations.

* * * * *